Figure 1:
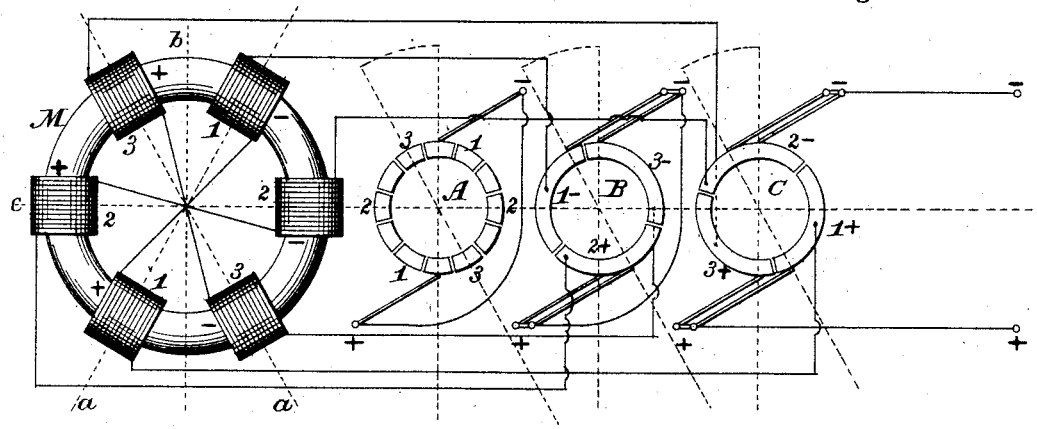

(No Model.)  F. BAIN.  2 Sheets—Sheet 1.
DYNAMO ELECTRIC MACHINE.

No. 287,609.  Patented Oct. 30, 1883.

Attest:

Inventor:
Foree Bain
by Foster & Freeman (No Model.) 2 Sheets—Sheet 2.
F. BAIN.
DYNAMO ELECTRIC MACHINE.
No. 287,609. Patented Oct. 30, 1883.
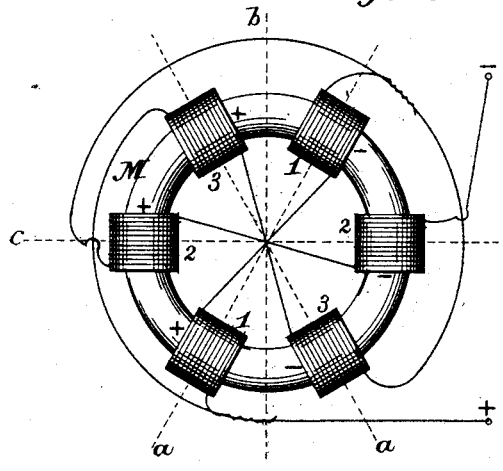
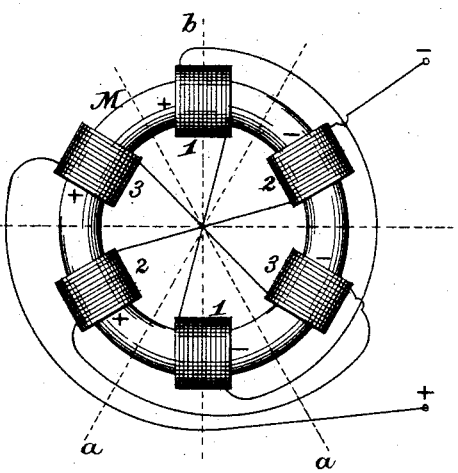
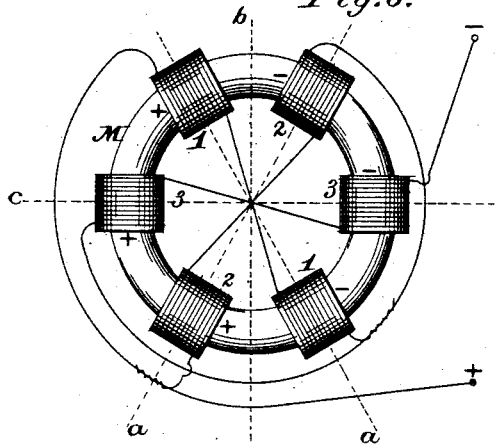
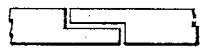
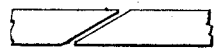
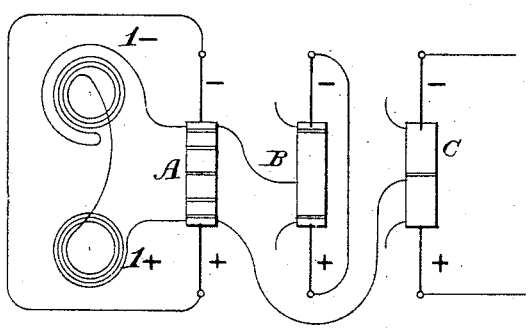
Attest:
Court A. Cooper
N. E. Hansmann.
Inventor:
Foree Bain
by Foster & Freeman

UNITED STATES PATENT OFFICE.

FORÉE BAIN, OF CHICAGO, ILLINOIS, ASSIGNOR TO THE BAIN ELECTRIC COMPANY, OF SAME PLACE.

DYNAMO-ELECTRIC MACHINE.

SPECIFICATION forming part of Letters Patent No. 287,609, dated October 30, 1883.

Application filed September 4, 1883. (No model.)

*To all whom it may concern:*

Be it known that I, FORÉE BAIN, a citizen of the United States, and resident of Chicago, Cook county, Illinois, have invented certain new and useful Improvements in Electric Generators, of which the following is a specification.

My invention relates to dynamo or magneto electric generators, and it has for its object to utilize all of the current generated by the revolving armature in one circuit external to the armature; to reduce the internal resistance of the armature to a minimum, and to short-circuit all useless or non-contributing bobbins or coils; and to accomplish these objects my invention consists more particularly in the manner of connecting the bobbins or coils of the armature through the commutators and brushes with the working or external circuit.

The underlying principle of my invention consists in directing the current through given bobbins or coils of the armature in parallel or multiple-arc circuit, and through other bobbins or coils of the same armature in series, according to the position occupied by the coils at the time in relation to the potential of the field-of-force through which the bobbins or coils are passing. In other words, the coils cutting the lesser number of lines of magnetic force are connected in multiple or parallel circuit, while those cutting the greater number of lines of magnetic force are connected in series circuit.

It is well-known that in machines of the so-called "Gramme or Pacinotti" type, wherein all the coils of the armatures are connected in closed circuit, the bobbins or coils passing at or near the neutral points of the field-of-force magnets generate a current of much lower potential than those passing a more intense field of force; but the current from the more active portions of the coils must pass through those less active and raise them to a common potential, the resistance of the coils at all points being equal or unchanged by an expenditure of their own force, thus reducing the total energy of the machine by the amount of work performed within the armature, and, besides, in this arrangement the internal resistance of the armature is greater than necessary or desirable for the amount of current sent to the external circuit. Various means have been invented for overcoming this objection, consisting in divers arrangements of the circuits of the armature and the commutators. For instance, the coils passing at or near the neutral point have been open-circuited, but the sudden opening and closing of the circuit of the coils, besides producing an extra spark, causes the coils to heat greatly, thereby lowering their conducting qualities. Moreover, this arrangement produces a wavey and unsteady current requiring a greater speed of revolution, in consequence of the bobbins or coils being cut out from contributing to the generation of the working electric current for a portion of the time, another objection being that the generated current is liable and often does shunt or flash through the open coils.

In my former application, No. 104,762, I have endeavored to overcome some of the aforesaid objections by dividing the generated currents into two circuits, the one of higher and the other of lower electro-motive force, and utilizing their energy separately. In the present invention I overcome the objections mentioned and include all the generated current in one external circuit. To accomplish this I so arrange the connections of the bobbins or coils that those coils passing through fields of lower, but substantially equal, potential—two pair, for instance—are connected in parallel or multiple circuit, which reduces their resistance to one-fourth ($\frac{1}{4}$) of what it would be if they were connected in series circuit, which would not increase their efficiency, while other bobbins or coils passing through fields of higher potential and generating currents of a higher electro-motive force are connected in series circuit. By means of the peculiar arrangement of commutators and brushes, more particularly hereinafter described, all the current generated is conducted to a single external circuit. When a coil arrives at the neutral line it is preferably momentarily short-circuited, at which time all of the other or active coils may be in series circuit. By this means the strength or tension of the current is equalized as the coil or coils passing the neutral point are withdrawn from the circuit, and all the active bobbins or coils occupy a field of substantially equal potential, and no useless or unproductive resistance is present in the circuit. To accomplish this result the bobbins or coils are arranged so that they are connected in groups of two diametrically-opposite coils, having their inner ends connected together, and their outer ends connected to segments of different commutator-rings, there being preferably as many commutator-rings as there are series of bobbins or coils, which may be any number desired. One of the commutator-rings is composed of twice as many sections as there are bobbins or coils, and the sets of coils are connected to the alternate sections of the commutator, the intermediate sections being insulators and not connected to the coils, and on these insulators the brushes bear when all of the coils are in circuit. When the brushes bear upon the segments connected to the opposite terminals of a pair of bobbins or coils, the said coils are short-circuited by means of the conductor joining the brushes. The object of this short-circuiting of the coils is, as before stated, to get rid of useless resistance while the coil is not contributing to the effective current. This is preferable to open-circuiting the coils, as by this arrangement the generated current of the other coils cannot "flash" through the idle ones. The remaining commutator-rings consist of an insulating-cylinder supporting the rings, composed of segments of conducting material insulated from each other, and so disposed on the cylinder that, preferably, the two segments connected to the opposite ends of a set of coils are in different rings.

In order to more particularly describe my invention, I have shown in the accompanying drawings a number of diagrams to more graphically show the connections of the various bobbins or coils with the commutators and brushes.

Figure 2:
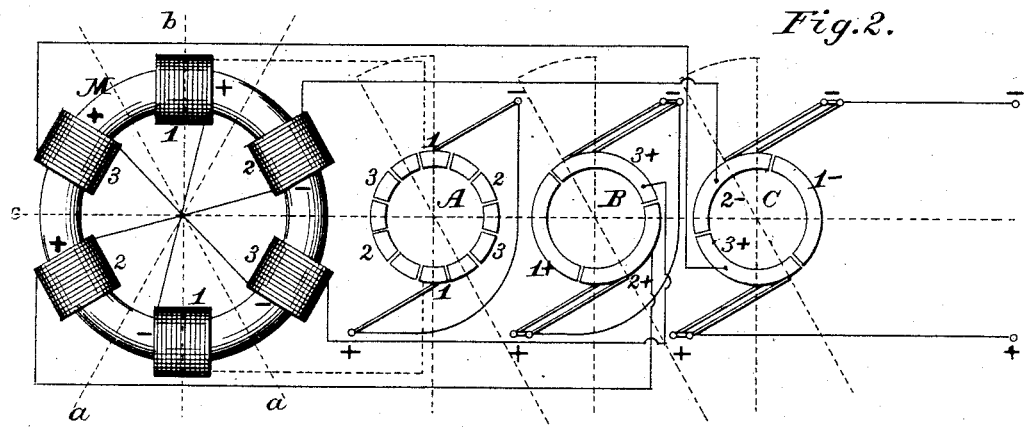
Figure 3:
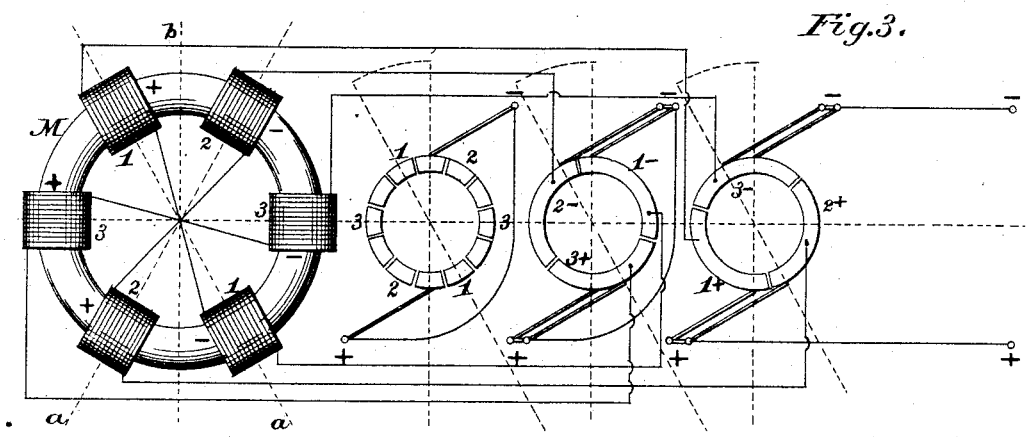

In Figs. 1, 2, and 3, M represents an armature-ring provided with six coils, and A, B, and C three commutator-rings. In Figs. 4, 5, and 6 the paths of the current are shown corresponding to the position of the coils and commutators shown in Figs. 1, 2, and 3, respectively; and in Figs. 7 and 8 are shown various ways of constructing the commutator-segments. Fig. 9 shows the manner of connecting the armature-terminals to both commutators.

Fig. 1 shows the relative positions of the coils, commutators, and brushes when coils 1— and 1+ arrive at a point shown by dotted lines $a\ a$, which diverges on each side thirty degrees from a perpendicular, $b$, drawn through the armature, which corresponds to the theoretically neutral line, the maximum line of magnetic force or potential being shown by line $c$.

Referring to Fig. 1, the circuit may be traced as follows: Starting at the — terminal to the segment 2— of commutator C, thence to the coil 2— and 2+ in series, thence to the segment 2+ of commutator B, thence by the double brushes through segment 1— and 3— through the coils 1— and 1+ and 3— and 3+, respectively, in parallel circuit, to the terminals 1+ and 3+ in commutator C and double brushes to terminal +. From the diagram it will be noticed that coils 1—, 1+, and 3— 3+ occupy positions equally of lower potential, and the coils 2— 2+ occupy a position of higher potential, and the current from these coils 2— 2+, which are connected in series, is directed so as to pass through coils 1— 1+ 3— 3+ in parallel circuit, thus reducing the resistance, and at the same time coils 1 and 3 contribute their efficiency to the effective current without lowering the electro-motive force of the more active bobbins, represented in this case by the coils 2— and 2+. Commutator A shows the brushes bearing upon the insulated segments, as in this position all of the coils are contributing usefully to the circuit and the brushes of commutators B and C are shown as bearing upon all six of the segments. If the coils 1 and 3 were of greatly-different electro-motive force and connected in parallel circuit, the one of the lower E M F would in a measure short-circuit the one of the higher E M F; but in this arrangement only coils of substantially equal E M F are connected in parallel circuit, and those in higher E M F are connected in series-circuit.

In Fig. 2 the coils 1— and 1+ are shown as occupying the neutral point, and are momentarily short-circuited through the segments 1 1 of commutator A, while the coils 2 3, which occupy a field of substantially equal potential, are connected in series. In this position the amount of current generated in the four coils connected in series is substantially equal to the amount of current generated in the six coils in the preceding position. Thus the current produced will be a practically even and steady current under all conditions. Fig. 3 shows the coils 1— and 1+ again restored to the general circuit after passing the neutral point, and they are in a field corresponding to that of the coils 2— and 2+, and consequently the coils 1 and 2 are connected in parallel circuit, and coils 3, being in fields of higher potential, are connected in series. It will thus be seen that all the coils are now in circuit, as previously shown in Fig. 1, only the coils have changed places, and this occurs in all the coils in circuit in turn. From these diagrams it will be clearly seen that the coils generating currents of lower and substantially equal E M F, have the current from the coils generating higher E M F, pass through them in divided and approximately equal circuit, and while they contribute their useful efficiency to the general circuit they also reduce the resistance of the internal circuit of the armature, and that coils are short-circuited only when there is practically no current generated in them.

In the drawings, I have shown double brushes upon the commutators B and C for the sake of illustration; but it is preferable to have the segments cut spirally, as shown in Fig. 7, or lapped, as shown in Fig. 8, in which latter cases single brushes may be used in place of the two shown in the drawings. By prolonging the lap of the commutator strips or segments it will not be necessary to short-circuit the coils at any time, although I prefer to do so in the manner heretofore set forth. Of course, it is to be understood that in this arrangement any number of coils may be used, and any form of commutator or short-circuiting devices may also be used; and I do not limit my invention to any particular form or construction of machine, for my invention, which consists in the manner of connecting the circuits above explained, may be embodied in many forms.

I have found that by the above connections the objections set forth in the first part of this specification are entirely overcome, and that more effective current for the amount of mechanical force used can be generated for utilization in translating devices than by any other known connection.

What I claim is—

1. The method, substantially as hereinbefore described, of connecting the coils of a dynamo or magneto electric machine, which consists in placing coils in fields of like potential in parallel circuit and others in fields of other potential in series.

2. The method, substantially as hereinbefore described, of connecting coils of an electric generator, which consists in placing coils generating currents of lower strength or tension in parallel circuit, and coils generating currents of higher strength or tension in series.

3. The method, substantially as hereinbefore described, of connecting the coils of electric generators, which consists in placing the coils generating currents of higher strength or tension in series circuit, and passing said currents through the coils generating currents of lower strength or tension in parallel circuit.

4. The method, substantially as herein described, of connecting the coils of an electric generator, which consists in connecting the coils generating effective currents in series, and connecting the coils passing the neutral point, so that they will be momentarily short-circuited and disconnected from the main circuit.

5. The combination, in an electric generator with an armature and armature-coils, of commutators and connections, substantially as described, the arrangement being such that coils in fields of force of like potential are connected in parallel circuit, and coils in fields of force of other potential are connected in series-circuit.

6. The combination, in an electric generator, with an armature and armature-coils, of commutators and connections, substantially as described, the arrangement being such that coils generating currents of lower strength or tension are connected in parallel circuit, and coils generating currents of higher strength or tension are connected in series circuit.

7. The combination, in an electric generator, with an armature and armature-coils, of commutators and connections, substantially as described, the arrangement being such that the coils generating currents of higher strength or tension are connected in series, and such current is passed through coils generating currents of lower strength or tension in parallel circuit.

8. The combination, in an electric generator, with an armature and coils, the coils being connected in pairs, of a number of commutators, to one of which the terminals of all the coils are connected, the terminals being also connected to segments upon the other commutators, and connections, substantially as described, whereby the coils passing the neutral point will be momentarily short-circuited, and the coils generating effective currents will be connected in series.

9. In an electric generator, the combination, with an armature, the coils of which are connected in pairs, of a number of commutators, to one of which the terminals of all the coils are connected, the terminals being also connected to segments upon the other commutators, and brushes and connections, substantially as described, the brushes upon the first commutator being short-circuited, whereby the coils generating currents of one strength or tension may be connected in series, those generating currents of another strength or tension may be connected in parallel circuit, and those generating practically no current may be short-circuited.

In testimony whereof I have signed my name to this specification in the presence of two subscribing witnesses.

FORÉE BAIN.

Witnesses:
DANIEL GOODWIN,
RICHARD WATERMAN.